Nov. 12, 1963 A. LIEB 3,110,763
ARRANGEMENT FOR THE TRANSMISSION AND REPRODUCTION OF IMAGES
Filed June 2, 1959 10 Sheets-Sheet 1

Fig.1

INVENTOR.
A. Lieb
BY

Fig.2

Nov. 12, 1963 A. LIEB 3,110,763
ARRANGEMENT FOR THE TRANSMISSION AND REPRODUCTION OF IMAGES
Filed June 2, 1959 10 Sheets-Sheet 3

INVENTOR.
A. Lieb
BY

Fig.7

United States Patent Office 3,110,763
Patented Nov. 12, 1963

3,110,763
ARRANGEMENT FOR THE TRANSMISSION AND REPRODUCTION OF IMAGES
Albert Lieb, Stuttgart-Bad Cannstatt, Germany, assignor to International Standard Electric Corporation, New York, N.Y., a corporation of Delaware
Filed June 2, 1959, Ser. No. 817,656
Claims priority, application Germany June 6, 1958
6 Claims. (Cl. 178—6)

Various methods have already become known for the electrical transmission of images of impinging rays. In one of the oldest methods, the so-called mechanical method, the picture information is decomposed into picture points by the use of apertured disks (Nipkow) and at the receiving end, these picture points are reunited again by means of a mirror wheel to form the total image. This method bears the disadvantage of being very expensive, of providing a poor picture reproduction, and of requiring much space for the accommodation of the apparatus.

The electrical methods for the picture transmission generally make use of the cathode-ray tube. The pick-up is effected with the aid of tubes which are equipped with a light-sensitive element, whereas for the reproduction of the picture there are used cathode-ray tubes, on the screen of which the picture to be reproduced is usually visible at a considerably reduced scale. The reproduction of the picture in such arrangements is entailed by a relatively high expense. In addition thereto the surface area of the picture to be reproduced is very limited, and the space requirement of the reproducing apparatus is large compared with the size of the picture.

Furthermore, projection-type television receivers are known in which the picture which is produced by the cathode-ray tube, is projected with the aid of optical means onto a projection screen. The projection-types of television receivers bear the disadvantage that the luminous density of the picture is very small, and that the space requirement as well as the technical expenditure (investment in circuit means) however, are very high.

More recently systems have been devised to reproduce television pictures with the aid of an electroluminescent screen. With conventional types of arrangements a layer of fluorescent substance consisting of an electroluminescent material is arranged within a system of crossed conductors to which, by means of a switching arrangement, signal voltages are applied successively. However, such arrangements only enable a small number of picture points or picture elements, and the necessary switching arrangement is very expensive. A further disadvantage may be seen in the high capacity between the individual conductors. Because of this there is required very expensive and highly efficient amplifiers with a low internal resistance.

The present invention relates to an arrangement for the transmission and for the conversion of pictures or images of an impinging radiation in which the individual picture elements act upon the electrical conductivity of radiation-sensitive elements, which, in turn, control the magnitude of an electroluminescent-exciting voltage.

According to the present invention, an electroluminescence-exciting voltage is conducted with the aid of photoconductive elements, which are excited in accordance with the picture scanning in a timed succession to control the electrical conductivity, and by radiation-sensitive elements associated with an electroluminescent screen these last named elements corresponding to picture elements, whereby corresponding surface areas are excited for effecting the electroluminescence.

The photoconductive elements may be constituted by a photoconducting layer which will be made conductive in accordance with the scanning. The conductivity excitation of the photoconducting elements may also be effected by the radiation of an electroluminescent layer. The described arrangement bears the advantage of requiring a low expenditure. The individual parts or layers may be manufactured in a simple way by a printing or spraying method. Compared with the usable picture area the space requirement of the arrangement is very low. In addition the size of the surface area of the picture to be reproduced is practically unlimited. The arrangement does not need to be manufactured or arranged in the vacuum. The possibilities of practical use of the arrangement are very versatile. By small modifications, the arrangement may be adapted to various applications of practical use.

Further features and advantages of the present invention will become more obvious from the examples of embodiments described hereinafter with reference to the accompanying drawings wherein.

Figure 1:
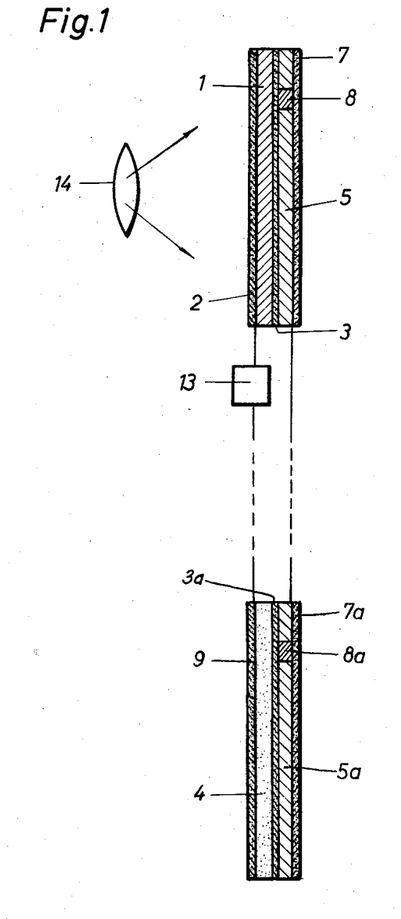
FIG. 1 is a schematic drawing illustrating a principle upon which the invention is based.

The principle of the invention will be better understood from the showing of FIG. 1. On a surface of a radiation-sensitive layer 1 there is deposited an electrically conductive layer 2 permitting the passage of the radiation. On this surface there is produced with the imaging arrangement 14, e.g. an optical lens system, the radiation image corresponding to the object to be transmitted. On the other surface of the layer 1 there is deposited successively an electrically conductive layer 3 opaque to the radiation, which e.g. consists of carbon, a photoconductive layer 5, as well as a further electrically conductive transparent layer 7. This arrangement represents the pick-up portion of the transmission arrangement.

The reproducing portion of the arrangement consists of an electroluminescent layer 4, covered on one side with an electrically conductive, optically transparent layer 9. On the other side of the electroluminescent layer 4 there are arranged successively an electrically conductive, opaque layer 3a, e.g. of carbon, a photoconductive layer 5a and an electrically conductive optically transparent layer 7a. The electrically conductive layers 7 and 7a are electrically connected with each other. To the layers 2 and 9 there is applied an electroluminescence-exciting voltage from the source of voltage 13.

In operation a limited conductive region 8 and 8a corresponding with the desired picture resolution is produced on the photoconductive layer 5 of the pick-up portion, and on the photoconductive layer 5a of the reproducing portion of the arrangement. These regions traverse the picture area in accordance with the picture scanning in any suitable manner as presently known in the art and are operated in synchronism. The conductivity ranges establish a conductive bridge between the layers 3 and 7 and the layers 3a and 7a, respectively. The resistance or the impedance of the layers 3 and 3a is substantially higher than that of the layers 1 and 4. Thus the conductive regions 8 and 8a substantially take the radiation values from the adjacent portions of the layer 1, or excite the adjoining electroluminescent portions of the layer 4, respectively, to produce the luminescence. This effect can also be achieved by making the series resistance of the layers 3 and 3a, respectively, substantially higher than the shunt resistance thereof. For example, the layers can be subdivided by the arrangement of strips of insulating material, so that the layer will be subdivided into individual conductive elements. Also the mixing of electrically conductive portions in a size, substantially corresponding to the thickness of the layer, with electrically insulating, nontransparent materials, such as with a nontransparent lacquer, or with a lacquer not permitting the passage of rays, may be provided.

By means of the layers 3 and 3a, respectively, the portion of the radiation-sensitive layers 1 and the electroluminescent layer 4 in front of the conductive regions 8 or 8a respectively, are connected with the electrically conductive layer 7 and 7a, respectively. When radiation impinges upon this portion of the radiation-sensitive layer 1, then a conductive connection is established from the electrically conductive layer 2 to the conductivity region or area 8. The resistance of this conductive path is determined by the intensity of the impinging radiation. On the reproducing side the portion of the electroluminescent layer 4 in front of the conductivity range 8a is excited to produce electroluminescence in accordance with the applied voltage which, in turn, is dependent upon the resistance bridge of the radiation-sensitive element of the pick-up portion. In this way the radiation intensity of the radiation impinging upon the layer 1 is transferred to the reproducing portion. The conductivity regions can be produced e.g. with the aid of an optical effect of rays, or with the aid of any other electromagnetic or corpuscular radiation. The scanning over the picture area can be effected in any suitable way, e.g. by means of a rotating apertured disk, Nipkow disk, mirrored wheel or by a timed successive switching-on of sources of light or radiation, acting upon various surface areas of the photoconductive layer. The source of rays may be moved mechanically over the surface area. The radiation-sensitive layer 1 can be designed to be sensitive to any kinds of rays, e.g. to electromagnetic radiation such as light, infrared, roentgen rays, ultraviolet rays, or corpuscular radiation, such as alpha or beta radiation. Together with the transmission there may then be carried out a conversion of the picture either into visible light or into any other desired radiation.

Figure 2:
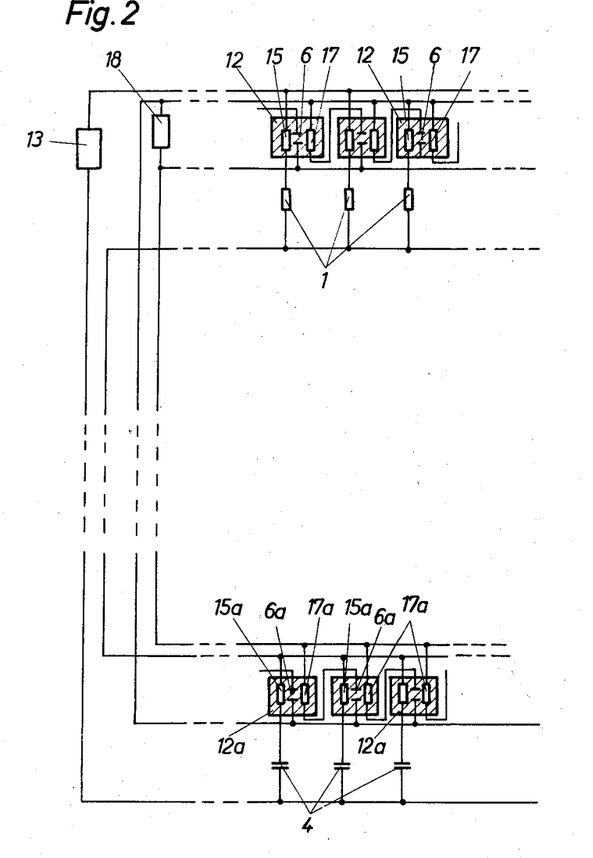
FIG. 2 is a schematic drawing illustrating an embodiment of the invention.

A further embodiment of the invention is shown schematically in FIG. 2 of the accompanying drawings. Similar parts are designated by the same reference numeral. In the pick-up portion there are arranged radiation-sensitive elemental areas or cells 1 similar to layer 1 of FIG. 1, such as photoconductive elements arranged on the pick-up surface. These cells are connected via picture-point switching elements 12 in a limited area corresponding to region 8 indicated generally in FIG. 1, with a source of voltage 13 capable of exciting an electroluminescent material to produce luminescence, which is switched on and off at predetermined periodic time intervals. The picture-point switching elements serve to connect source 13 to the radiation-sensitive or electroluminescent elements, which together represent the picture surface, in a timed succession. The other pole of the source of voltage 13 is connected via electroluminescent capacitors 4 of the reproducing portion and further picture-point switching elements 12a arranged there, to the other terminal of the elements 1. The photoconducting resistors 15 or 15a respectively, of the picture-point switching elements 12 or 12a respectively, constitute the operating circuit thereof. The arrangement is made in such a way that the conductivity of the layers 15 or 15a respectively is affected to a great extent by the light emission of the electroluminescing capacitors 6 or 6a respectively. In other words, that there exists a tight optional coupling between these layers. Between the individual picture-point switching elements external electrical and optical coupling is prevented e.g. by means of electrically conductive shielding layers and/or by layers not permitting the passage of light rays or of rays in general. More detailed structural embodiments of the resistive and capacitive elements are presented in connection with FIGS. 8–11, as discussed hereinafter in column 8.

The electroluminescent capacitors 6 or 6a respectively, are connected via further photoconducting resistors 17 or 17a respectively, with the source of voltage 18. By this connection the layers 17 or 17a, respectively, are acted upon by the electroluminescent capacitors 6 or 6a of the preceding picture-point switching element 12 or 12a, respectively, as regards the electrical conductivity. The source of voltage 18 produces at a predetermined time interval a voltage exciting an electroluminescence, which will be referred to hereinafter as the voltage surge or pulse. This surge may e.g. be a momentarily applied direct-current voltage, or any other succession of voltage variations. By the term succession of voltage variations there is to be understood e.g. a succession of wave trains of an alternating-current voltage, a succession of voltage pulses, or the like. The voltage variation may also be the half-wave of an alternating-current voltage, or only a simple voltage pulse.

Assume an initial condition, in which the photoconducting resistor 17 of any arbitrarily chosen picture-point switching element 12 has an increased conductivity on the pick-up side, and in which the photoconducting resistor 17a belonging to the picture-point switching element 12a has a conductivity on the reproducing side which is increased with respect to that of the normal condition. Then, during the next successive excitation phase of a voltage of the source of voltage 18 electroluminescence will be produced, in both the pick-up portion and the reproducing portion in the electroluminescent capacitors 6 and 6a of the succeeding picture-point switching elements 12 and 12a. The photoconducting resistors 15 or 15a, respectively, of these switching elements are in this way rendered conductive. The electroluminescent capacitors 4 of the reproducing portion forming part of these switching elements, are excited to luminescence to a more or less strong extent by the voltage source 13, in accordance with the radiation intensity impinging upon the radiation sensitive resistor 1. Thereby the radiation image of the corresponding extract of the picture is transmitted or transferred from the pick-up to the reproducing portion. Depending on the spectral emission properties of the electroluminescent capacitors 4 and the radiation impinging upon the layer 1, there can be carried out simultaneously a conversion of the radiation picture. With the excitation of the electroluminescent layers of the electroluminescent capacitors 6 and 6a of the individual picture-point switching elements 12 and 12a the photoconducting resistors 17 and 17a are rendered conductive. The material composition of these layers is so chosen that the conductivity will continue, at least during the short period of time until the next successive excitation pulse arrives. In the course of the next excitation phase of the voltage source 18 the electroluminescent capacitors 6 or respectively 6a of the successively following picture-point switching elements 12 and 12a are now excited to luminescence, so that the same process will be repeated in the manner as described hereinbefore.

Depending on the purpose of practical application it is desirable to choose the decay time of the photoconducting resistors 15a so that their conductivity will only have substantially died away when the new excitation of the picture-point switching element occurs. That is, during next successive picture transmission cycle. In this way the picture brightness will be increased, and that also, especially at a slow picture-transmission, there appears no flickering. However, the same may also be accomplished with a corresponding duration of afterglow of the electroluminescent layers 4. At present, however, it is still rather difficult to prepare electroluminescent substances to have a corresponding afterglow effect. The time duration and the time interval of the voltage surges are so adapted to the electrical and optical properties of the picture-point switching element that after two successive voltage surges the conductivity excitation of the photoconductor will have died away to such an extent that the voltage of the luminescent capacitor connected therewith has dropped below the excitation threshold value.

Figure 3:
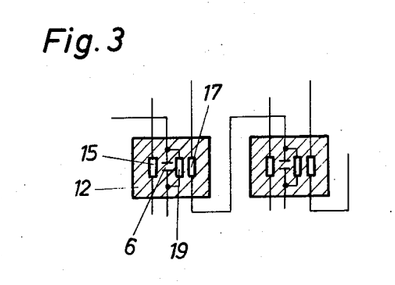
FIG. 3 shows a modified embodiment of certain features of FIG. 2.

A somewhat modified embodiment of the picture-point switching elements is shown in FIG. 3. The same parts are again denoted by the same references as in FIG. 2. The electroluminescent capacitors 6 are in this case connected in parallel with respective photoconducting resistor 19, which is tightly coupled optically with the electroluminescent layer. The decay time of the photoconducting layer 19 is so adjusted to the time duration of the electroluminescence voltage excitation that without the luminescence of the luminescent capacitor 6 being substantially reduced during the excitation period there will remain a sufficient excitation in the photoconducting layer 19 during the time of outage of the voltage excitation, that any possibly still existing residual excitation of the photoconductor 17, which would be likely to cause a new excitation of the electroluminescent layer 6, will be reliably excluded.

Figure 4:
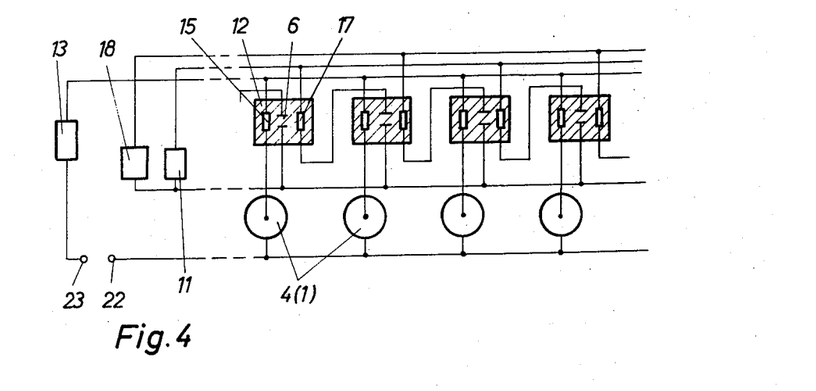
FIG. 4 shows a further embodiment of the invention illustrated in FIG. 2.

In FIG. 4 there is shown an embodiment which, on principle, corresponds to the arrangement as shown in FIG. 2. Instead of a single generator of voltage surges there are provided for the luminescence excitation of the electroluminescent capacitors 6 two such voltage sources 18 and 11 alternately delivering electroluminescence-exciting voltage surges. The arrangement is that the surges coming from the individual voltage generators 18 and 11 are alternately fed to the individual picture-point switching elements. This arrangement has the advantage that a second excitation of the once switched picture-point switching elements, due to the residual excitation of photoconductors 17 is practically impossible. Assuming that at any respective time position in a picture-point switching element, and through the electroluminescent layer of the electroluminescent capacitor 6, the correspondingly optically coupled photoconducting layer 17 is excited, then, at this particular time position, no voltage exciting the electroluminescence will be supplied by the corresponding voltage exciter. An excitation of the photoconducting layer and, consequently, a transfer of the switching process, is not effected until after the corresponding other voltage generator is switched on during the next successive excitation process. In this case the decay time of the photoconducting layer 17 is so chosen that it has died away to such an extent that the excitation of the electroluminescent capacitor connected therewith, is below the threshold value during two voltage surges.

This principle may also be applied to the reproducing side. Accordingly, in the example of FIG. 4, either photoconducting elements 1 or electroluminescent layers 4 are indicated by the circles. The terminals 22 and 23 represent the output of the pick-up portion or the input of the reproducing portion. The synchronization of the arrangement of the picture-point switching elements of both the pick-up and reproducing portion may be carried out by employing the same voltage exciters 13 and 11 with the pick-up and reproducing portion.

Figure 5:
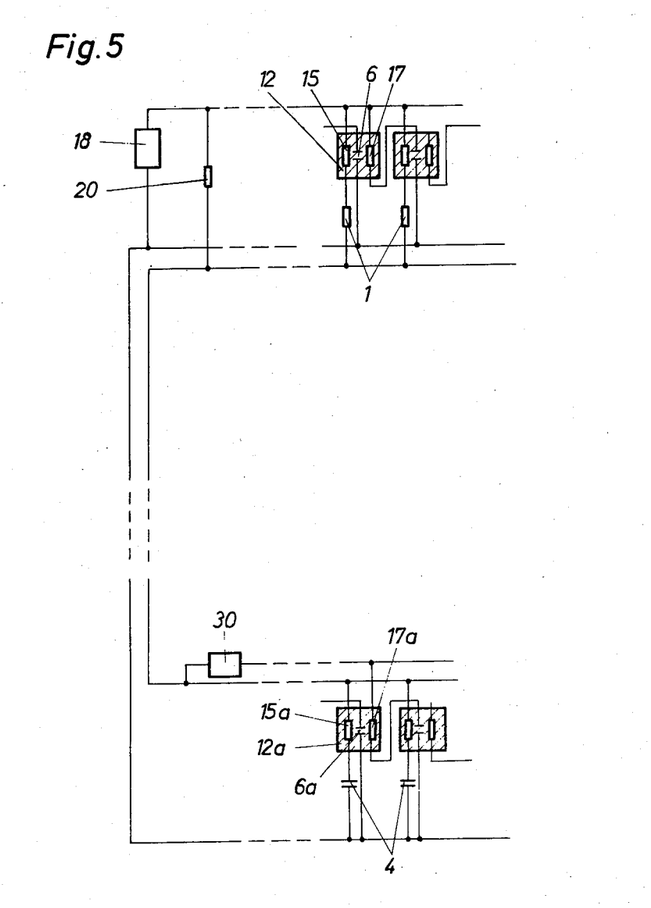
FIG. 5 shows a modification of the invention illustrated in FIG. 4.

In FIG. 5 there is shown an example in which the voltage 13 exciting the luminescence of the layers 4 (as in FIG. 1), is derived from the voltage source 18. Again the same components are designated by the same references. The substantial difference of this embodiment compared with the preceding ones consists in that the voltage surges supplied by the voltage source 18 directly act upon the layers 1 of the pick-up portion. Both the release and the transfer of the individual picture-point switching elements is again accomplished by the photoconducting layers 17. The radiation-sensitive layers are varied in accordance with the appearing light intensity. The thus modulated succession of voltage surges is transferred to the reproducing portion. On the reproducing side there is provided a circuit arrangement 30 which is adapted to convert the voltage variations which are modulated with respect to their magnitude in dependency upon the light values, into voltage values of equal magnitude. The pulses of equal magnitude delivered by the switching element 30 are fed to the photoconducting layers 17a of the individual picture-point switching elements, whereas the successions of voltage variations which are variable with respect to their magnitude, are applied to the photoconducting layers 15a of the individual picture-point switching elements. In parallel with the photoconductors 15 of the individual picture-point switching elements and the radiation-sensitive layers 1 on the pick-up side there is connected a resistor 29. This resistor is so dimensioned that in the case of a dark value of the picture-point pick-up elements at the switching device there will be applied a voltage level which is necessary for transferring the picture-point switching element.

Figure 6:
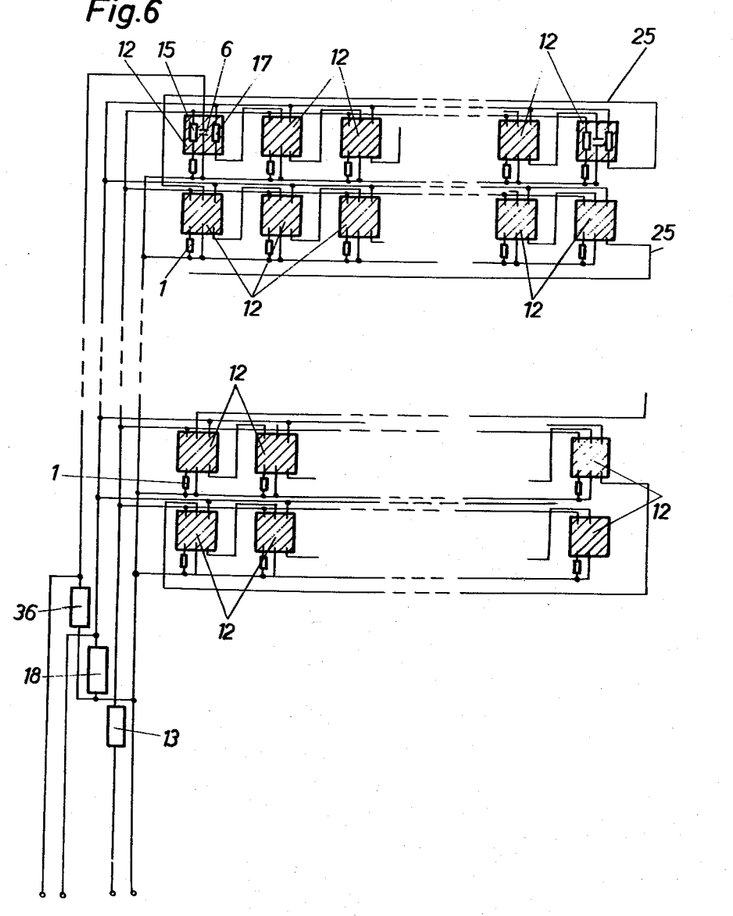
FIG. 6 is a schematic diagram illustrating the pick-up portion of the invention with particular reference to scanning the picture image.

In the example shown in FIG. 6 of the drawings it is shown how the individual picture-point elements 12 or 12a respectively of the pick-up and reproducing surface are arranged and electrically connected with each other. The individual picture-point switching elements are disposed in lines and are connected-through line after line. The triggering of the picture scanning is effected by an individual voltage surge or pulse produced by the generator 36. This pulse or surge is adapted to excite the electroluminescent capacitor 6 of the first picture-point switching element of the first line. In the course of the next voltage surge—as already mentioned in the description relating to FIG. 2—there is excited the next successive picture-point switching element. Upon connecting-through the first line there is excited, via the connecting lead 25, the electroluminescing capacitor 6 of the first picture-point switching element 12 of the second line. In the same way there is then effected the connecting-through of the further or remaining lines.

The voltage generator 18 delivers periodically appearing voltage surges. The source of voltage 13 supplies a voltage exciting the electroluminescence. This source is connected via the parallel photoconducting layers 15 of the individual picture-point switching elements 12 with the radiation-sensitive layers 1, the resistance of which is varied in accordance with the impinging light intensity.

In the embodiment as shown in FIG. 6 there is merely shown the pick-up portion. The reproducing portion is designed in accordance with the arrangement as described with reference to FIGS. 2 and 5. In order to accomplish a synchronization of the picture release in the reproducing and pick-up portion, the voltage surge produced by the generator 36 is also conducted to the reproducing portion and releases there, just like in the pick-up portion, an electroluminescent excitation of the electroluminescent capacitor of the first picture-point switching element of the first line.

Figure 7:
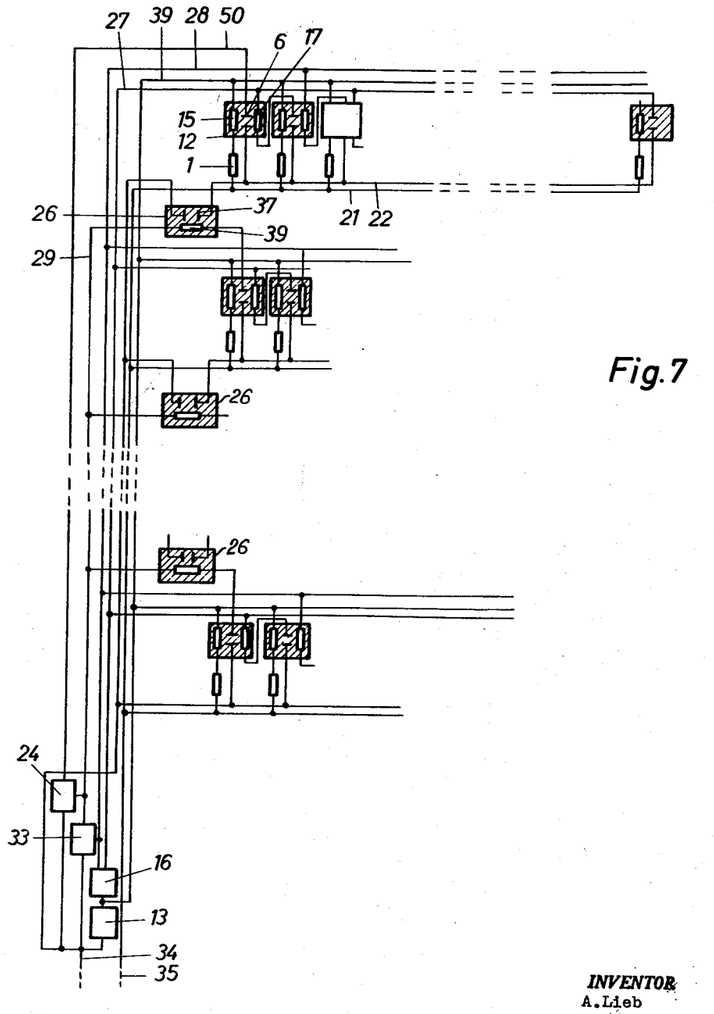
FIGS. 7 and 7A are schematic diagrams of the pick up and reproducing portions of a modification of the invention over that illustrated in FIG. 6, FIGS. 8–11 show in section the practical construction of the switching arrangement as shown in principle in FIG. 7, FIGS. 9 and 10 are cross-sectional views taken on section lines CD and AB of FIG. 11.
Figures 7A, 11:
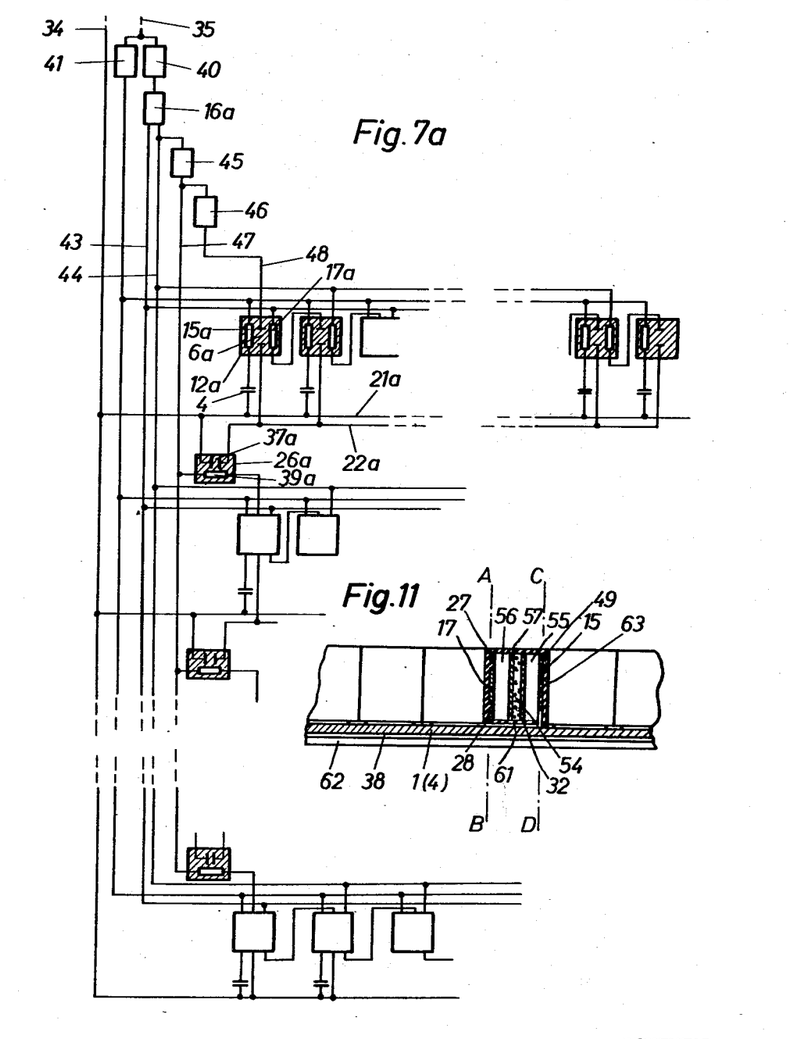
FIG. 11 shows a cross-sectional view taken on line EF of FIG. 9.

In FIGS. 7 and 7a there is shown an embodiment in which the release for scanning the total picture as well as also of the individual lines is effected with the aid of synchronizing pulses. On the pick-up side there is arranged a voltage generator 13 supplying a periodically appearing voltage exciting the electroluminescence. After a period of time, at least corresponding to the period of scanning of one line, there is caused a somewhat longer-lasting voltage-free time interval. Upon completion of the scanning of the whole picture the voltage-free time interval is expanded for a particularly long time. A switching element 16 now also divides the voltage exciting the electroluminescence alternately into two current paths 27 and 28. In the course of the current path or circuit 28 there is disposed a further switching element 33 which, upon insertion of a new succession of voltage excitations, produces an impulse in the circuit 29 after having reached the respective end of the line. In the same way, and by the action of the switching element 24, a non-recurrent voltage surge will be applied to the line 50 upon insertion or starting of the scanning of the picture.

The structure of the individual picture-point switching elements corresponds to that as shown in FIG. 2. Of course, instead of this construction there may also be used any of the types of the picture-point switching elements already described. For example, those according to FIG. 3. The photoconducting layers 15 of the picture-point switching elements 12 are connected via the lead 27, 28, and the switch 16 to the one pole to the source of voltage 13 exciting the electroluminescence. On the pick-up side there are arranged in this circuit the radiation-sensitive layers 1, the electrical conductance of which corresponds to the intensity of the impinging radiation. The lines 21 and 35 are adapted to connect the photoconducting layers 1 of the pick-up portion with the reproducing portion, while the line 22 connects the electroluminescent capacitors 6 of the picture-point switching elements with the electroluminescent capacitors 37 of the line switching elements 26. On the reproducing side the corresponding lines are denoted by 21a or 22a, respectively. The capacitors 6 of the individual picture-point switching elements of one line are connected with the capacitors 37 of the so-called line switching element 26. The electroluminescent layer of the electroluminescent capacitor 37 accordingly delivers a corresponding light pulse at every picture-point switching process of one line. The photoconducting resistor 39 of the line switching element 26 which is optically coupled in a tight manner to the electroluminescent layer 37 is provided with such a duration of afterglow that upon appearance of a line-current pulse in the line 29 the first picture-point switching element of the successive line will be excited. In the same way also the other lines will be connected through.

In the reproducing portion the voltage surges arriving on the line 35, and corresponding to the individual radiation intensities of the picture, are first of all, if required, brought to a sufficient voltage level by an amplifier 41. A further amplifier 40 which is connected in parallel therewith, and which operates within the saturation range, amplifies the incoming pulses in such a way that always independently of the modulation, there will appear the same voltage amplitude. By the action of a switching element 16a the voltage surges are alternately applied at the output of the amplifier 40 to the lines 43 and 44. The switching element 45 disposed in the line 44, applies at the beginning of the succession of surges or pulses arriving in the line 47 of one line, a non-recurrent voltage surge, whereas the switching element 46 which is provided in the line 47 applies, upon insertion or starting of the scanning of the picture, i.e. subsequently to the end of the long voltage-free time interval, a voltage surge or pulse to the line 48. The structure of the picture-point switching element 12a again corresponds to the arrangement according to FIG. 2. As with the pick-up portion, also in the case of the reproducing portion the electroluminescent capacitors 6a of the picture-point switching elements 12a of a line are connected with each other as well as with one electrode of a luminescent capacitor 37a of a line switching element 26a. The photoconducting layers 15a are respectively connected via the electroluminescent layers 4 and the line 34 with the pick-up portion. The current pulse which is produced in the circuit arrangement 24 at the beginning of a picture transmission cycle excites the luminescent capacitor 6 of the first picture-point switching element of the first upper line for effecting the light emission. On account of this the optically coupled photoconducting layers 15 and 17, which are disposed in the switching element 12, become electrically conductive. The voltage supplied by the voltage generator 13a is thereby conducted to the photoconducting layer 1 of the first picture element of the first line. The current produced in the switching circuit is modulated in accordance with the intensity of the impinging radiation and is conducted via the lines 34 and 35 and the amplifier 41 to the reproducing portion. On the layer 4 of the first picture-point of the first line of the reproducing portion there will appear an electroluminescence, the intensity of which corresponds to the radiation value received by the pick-up portion. The current pulse subsequently arriving on the line 27 of the pick-up portion is transferred via the excited photoconducting layer 17 of the first picture-point switching element of the first line to the electroluminescent capacitor 6 of the next successive picture-point switching element of this particular line. In this way, and in the manner as described hereinbefore, the radiation value of the pertaining element 1 is transferred to the electroluminescent layer of the second picture-point switching element of the first line of the reproducing portion.

All of the voltage surges or pulses extending via the individual picture-point switching elements of the first line are also adapted to excite the electroluminescent layer of the electroluminescent capacitor 37 or 37a, respectively, of the line switching element of the next successive line. The decay time of the excitation of the photoconducting layers 17 or 17a, respectively, is dimensioned in such a way that upon connecting-through of the total line there will remain a residual conductivity of the photoconducting layer 39. The line voltage surge or pulse appearing on the line 29 subsequently to the connecting-through of the first line is transferred via the photoconducting layer 39 to the electroluminescent capacitor 6 of the first picture-point switching element of the second line, on account of which also this entire line will be connected through. In a similar way also the further lines will be connected through consecutively.

Figure 8:
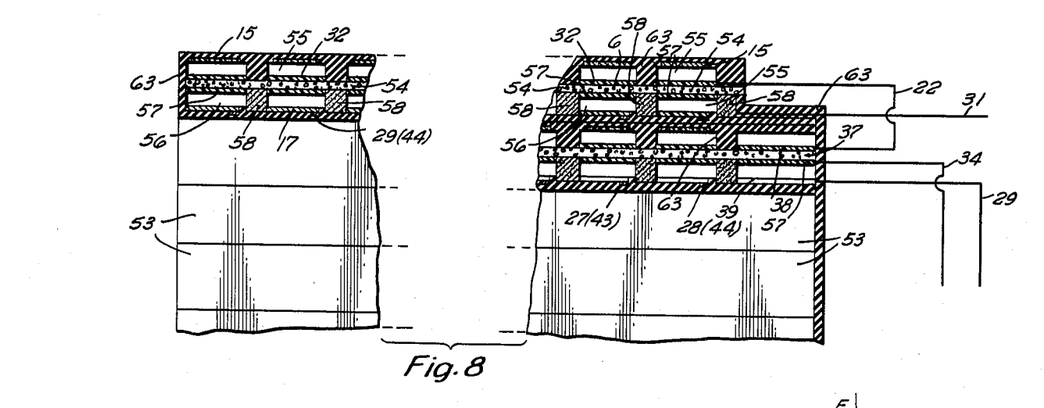
Figure 9:
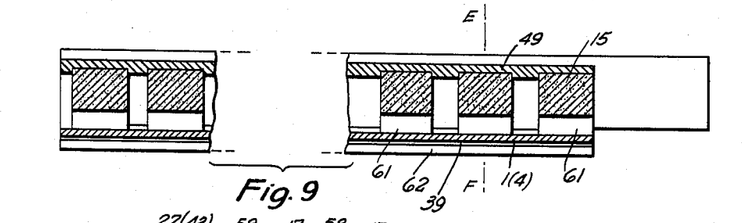
Figure 10:
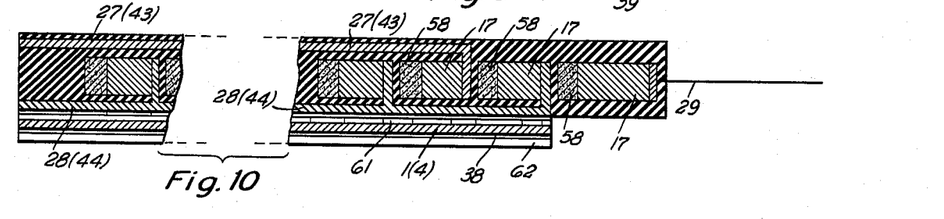

In the following FIGS. 8–11 there is given an example relating to the practical construction of the picture-transmission arrangement as shown in principle in FIG. 7. FIG. 8 shows a longitudinal section of the arrangement, while FIGS. 9, 10 show cross-sectional views taken on lines CD, AB of FIG. 11 while FIG. 11 shows a view taken on line EF of FIG. 9. Same components are again indicated by the same references. Along the picture surface or area there are arranged strip-like circuit elements 53 which are adapted to take over the transfer or transmission of the lines of the picture. On partial surfaces of the transparent, electrically insulating carriers or supports 55 and 56 which are provided with cut-out portions, there are arranged electrically conductive, transparent layers 32 and 57. Therebetween is arranged an electroluminescent layer 54. The conductive layers 32 and 57 disposed between the cutouts and the electroluminescent parts of the layer represent the electroluminescent capacitors 6 of the individual picture-points switching elements 12 as described in the example of FIG. 7. The cutouts of the carrier 56 are filled out with an electrically conducting, optically nontransparent material 58, e.g. carbon. In this way there is avoided a disturbing optical coupling between the individual picture-point switching elements, and an electrical connection is established between the conducting layer 57 constituting the boundary of the one side of the electroluminescent layer of luminous material, and the photoconducting resistor 17 forming part of the respectively adjacent picture-point switching element.

The elements 17 are alternately connected with electrical conducting layers or lines 27 and 28, respectively (pick-up portion) or 43 and 44 (reproducing portion). To these conducting layers there is applied, as described in the example of FIG. 7, alternately an electroluminescence-exciting voltage. To the carrier 55 there is applied a photoconducting resistance layer 15. One side of this photoconducting layer is connected with an electrical conductive layer 49 to which a voltage exciting the electroluminescence, and indicated by the reference 13 in FIG. 7, is applied. On the opposite side of the photoconducting layer 15 there are arranged the conducting layers 61. These conducting layers, as will be seen from the showing of FIG. 11, extend via one edge of the switching strips to portions of an adjacent strip surface. Each of these conducting layers is assigned to one picture-point switching element 12, and is electrically separated from the others. On the conducting layers 61 of the various strip-like elements 53 there is arranged in the pick-up portion the radiation-sensitive layer 1 and in the reproducing portion the electroluminescent layer 4, respectively.

The layer 1 or 4, respectively, is deposited onto an electrically conductive layer 38 permitting the passage of rays, which layer 38 is disposed on a carrier 62 likewise permitting the passage of rays. The layer 38 simultaneously takes over the function of the connecting line 21 as described in the example of FIG. 7.

In the cutout portions of the carrier 55 as well as on the surface of the switching strips 53, in order to avoid a disturbing external and mutual interaction of the picture-point switching elements, there are arranged electrically insulating, and optically nontransparent layers 63, i.e. which do not permit the passage of rays. These layers 63, for example, may be electrically insulating layers of lacquer.

The first picture-point switching element of the first line, which is constituted by the capacitor 6a receives an exciting voltage surge or pulse, as already described in the example of FIG. 7, via the conducting layer 58 and the line 31 upon the respective starting of the scanning of the total picture. On account of this, and in accordance with the voltage surges or pulses appearing in the conducting layers 32, 27 and 28 or 32, 43 and 44, respectively, successively all of the picture-point switching elements of the upper line will be connected through. The transparent conducting layers 32 of this switching strip are connected via the line 22 with the transparent conducting layer 38 of the electroluminescent capacitor 37. This luminescent capacitor, together with the photoconducting resistor 39, represents the line switching element as described in FIG. 7.

The photoconducting resistor 39 which is optically coupled to the luminescent capacitor, subsequently to the connecting-through of the first lines, conducts the line pulse only appearing in the line 29 to the first picture-point switching element of the second line, whereby also the switching strip of the second line is being connected through. In the same way also the further switching strips are successively connected through.

Figure 12:
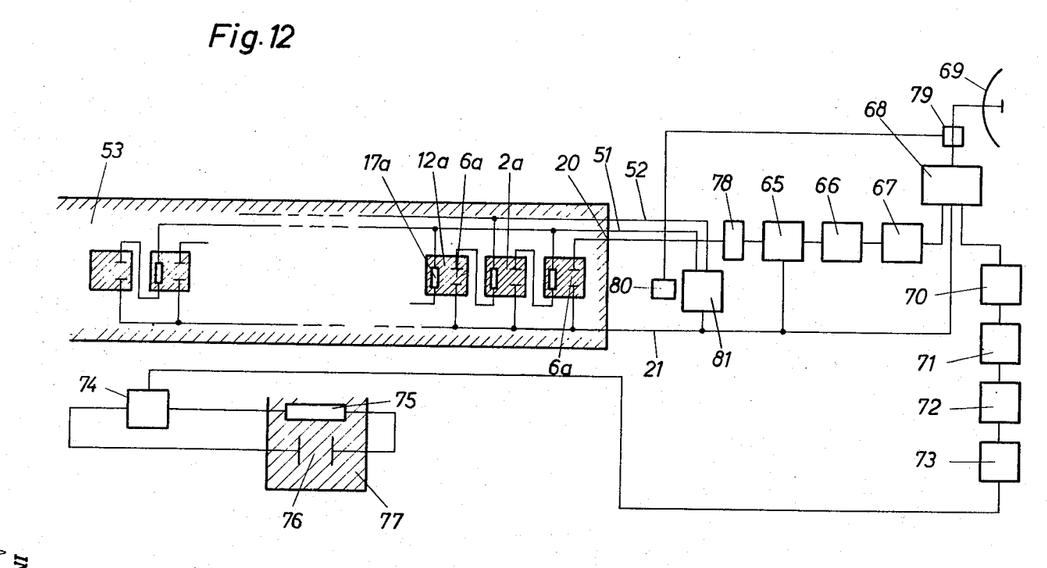
FIG. 12 is a schematic diagram of the invention as applied to the presentation of a radar pattern.

One practical application of the invention for the representation and transmission of a radar pattern will now be described with reference to FIGS. 12, 13 and 14. In FIG. 12 the principle is shown in a schematic representation. The voltage pulse which is periodically produced by the pulse generator 65 is fed via the modulator 66 to the transmitter 67. The high-frequency pulse which is thus released by the transmitter is fed in the conventional manner via the transceiver switch 68 to the antenna 69. The received high-frequency is led via the mixer stage 70 and the IF-amplifier 71 to the detector 72. The rectified high frequency, if necessary, is reamplified in a picture amplifier 73 and is then fed to a switching element 74, which depending on the picture amplitude 73, modulates a voltage which excites an electroluminescent substance or material to produce the luminescence.

The switching element 74 may be e.g. an electron tube with a control characteristic, to the control grid of which there is applied an alternating-current voltage as well as also the picture signal. In the anode circuit of the tube, depending on the amplitude of the picture signal, there is produced a lower or higher alternating-current voltage exciting the electroluminescence.

The voltage as produced by the switching element 74 is fed to the imaging device 77, consisting of the photoconductor 75 and of the luminescent capacitor 76. Both the photoconductor 75 and the luminescent capacitor 76 are electrically coupled to each other and, e.g. designed as two surfaces touching each other, i.e. are in contact with one another, or as two surfaces which are connected with each other electrically by means of intermediate layers, the size of said surfaces corresponding to the size of the picture area. Immediately in front of the photoconductor 75 of the imaging arrangement 77 there is rotating a switching strip 53 containing picture-point switching elements 12a which are arranged along a straight line. The time of rotation of the switching strip corresponds to that of the antenna. The synchronous rotation of the antenna and of the switching strip is accomplished, for example, by two synchronous motors 79 and 80. The voltage generator 81 applies to the lines 51 and 52 alternately voltage pulses exciting the electroluminescence. The timed succession of these surges or pulses determines the connecting-through velocity of the picture-point switching elements of the switching strip. The pulse generator 65 is connected with the switching arrangement 78. This arrangement, when triggered by a pulse, delivers a voltage surge exciting the luminescence capacitor 6a of the first picture-point switching element 12a of the switching strip for producing the electroluminescence. In this way the optically coupled photoconductor 17a of this picture-point switching element will become conductive. On account of this, and during the next voltage surge appearing in the line 52 the luminescent capacitor 6a of the next picture-point switching element will be excited to produce the electroluminescence, and the optically coupled photoconductor of this particular element will be rendered conductive. The further processes are repeated one after the other with respect to the individual picture-point switching elements. The elements are connected through successively.

Between the luminescent capacitors 6a of the individual picture-point switching elements and the photoconducting surface 75 there exists a tight optical coupling. Every light pulse of the luminescent capacitors produces on the surface 75 a corresponding conductivity area. In view of the rotating motion of the switching strip, of the straight-lined arrangement of the individual picture-point switching elements and of the connecting-through which is effected successively with respect to time, the conductivity area or range extends along radii which, in accordance with the antenna, pass through the entire face plate area (picture surface).

The passage velocity along the radii is determined by the succession of surges and is adapted to the telemetric scale of the object to be imaged. On the electroluminescent picture surface the objects are imaged in accordance with the high frequency impinging upon or received by the antenna and reflected by the object, in a manner correctly observing both the distance and the angle.

Figure 13:
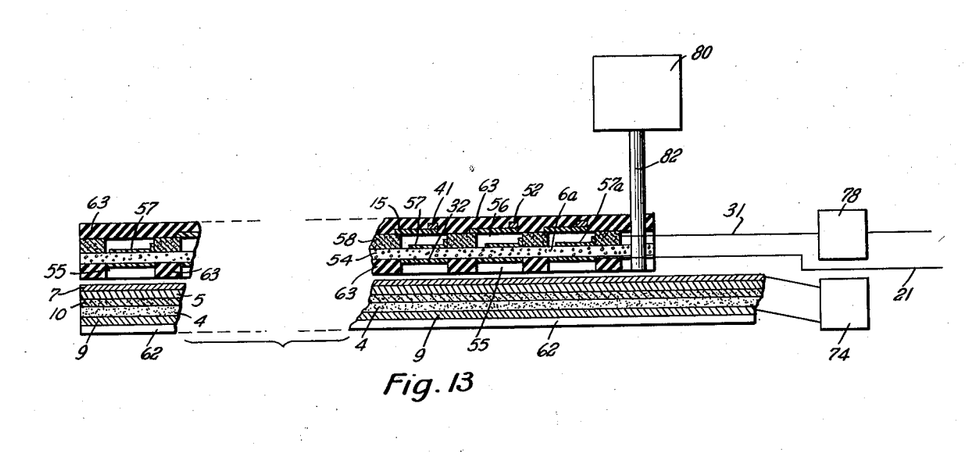
FIGS. 13 and 14 show examples of the practical construction of that embodiment of the invention illustrated schematically in FIG. 12.
Figure 14:
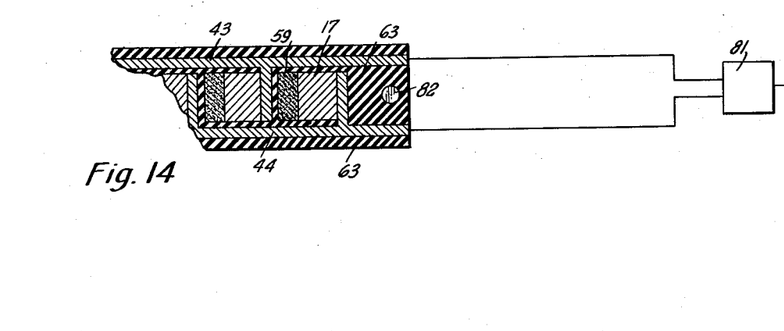

In FIGS. 13 and 14 there is shown in a longitudinal and cross-sectional view embodiment of the construction of the imaging arrangement 77, and of the switching strip 53. The imaging arrangement consists of the optical transparent base 62 on which successively there are arranged the transparent, electrically conducting layer 9, the electroluminescent layer 4, the electrically conductive, but optically nontransparent layer 10, the photoconductive layer 5 as well as the electrically conductive, optically transparent layer 7. The base or carrier 62 may consist e.g. of glass or mica, the layer 10 may consist of carbon, and the electrically conductive, optically transparent layer 9 may consist of tin oxide, which may be obtained by the reaction of tin chloride or tin tetrachloride with the heated glass or mica base. To the layers 9 and 7 there is applied the voltage which is produced by the circuit arrangement 74, modulated in accordance with the picture information and adapted to excite the electroluminescence.

The embodiment of the switching strip, on principle, corresponds to the switching strip described in the embodiment of FIGS. 8 and 11, and assigned to the individual line elements. The same components are denoted by the same references. Onto the partial surfaces of the base plates or supports 55 and 56 which are provided with cut-out portions, there are deposited the electrically conductive, transparent layers 32 and 57. Therebetween is arranged the electroluminescent layer 54. The conducting layers as well as the electroluminescent layers arranged between the cut-out portions of the bases 55 and 56 represent the luminescent capacitors 6 (corresponding to the description of FIG. 12), of the individual picture-point switching elements.

The cut-out portions of the bases 56, for preventing optical coupling between the individual luminescent capacitors 6 and for establishing an electrical connection between the conducting layers 57 belonging to the individual luminescent capacitors, and the photoconducting resistance layer 17 belonging to the respectively adjacent picture-point switching element, are filled out with an electrically conductive, but optically nontransparent material 58. The photoconductive layers 17 are also alternately connected with the conductive layers 43 and 44. These lines are alternately supplied by the voltage generator 81 with voltage pulses or surges exciting the electroluminescence. The voltage pulse as produced by the circuit arrangement 78 upon release of a transmitting pulse, and adapted to excite the electroluminescence, is applied to the conductive layer 57a of the first picture-point switching element. Into the cutouts or cut-out portions of the base 55 as well as onto the surface of the switching strip, in order to avoid a disturbing external or mutual interaction of the picture-point switching elements, there are deposited electrically insulating layers 63 which are opaque to the passage of any radiation, such as a dark layer of lacquer. The distance between the switching strip and the imaging arrangement is chosen to be as small as possible. Via the axis 82 the switching strip is connected with the rotation device 80, e.g. with a motor running synchronously with the rotation of the antennas. In FIGS. 13 and 14 the lead-in conductor of the voltage to the rotating switching strips is not shown. This feed-in may be effected e.g. with the aid of slip rings.

It is to be understood that the invention is in no way restricted to these given examples of embodiment.

What is claimed is:

1. An electrical switching arrangement for scanning in a predetermined successive sequence a plurality of picture areas of an image translation surface comprising: a plurality of cellular switching elements arranged in a repetitive coordinate array on said surface, each of said switching elements being adapted to provide a source of voltage to a corresponding adjacent elemental picture area of said surface; each of said switching elements comprising an electroluminescent capacitor formed of two conductive transparent electrode layers transverse to said surface and having luminescent material therebetween; a first and a second photoconducting resistor layer, one positioned on each side of said capacitor, said first resistor being optically coupled thereto and said second resistor being electrically coupled thereto and optically shielded therefrom; a source of periodic voltage variations for exciting luminescence in said capacitor; a first circuit means connecting said source to said first resistor layer, said first resistor being coupled in a first series circuit to said surface at said corresponding elemental picture area; a second circuit means connecting said source, said second resistor and said electroluminescent capacitor of an adjacent switching element in a second series circuit; means for optically shielding said adjacent switching elements; the periodicity of said voltage variations being substantially equal to the decay period of said photoconducting resistors.

2. An electrical switching arrangement according to claim 1 wherein that portion of said second series circuit between said second resistor and said electroluminescent capacitor is a non-transparent conducting connection layer incorporating as a part thereof said optical shielding means.

3. An electrical switching arrangement according to claim 1 wherein the elemental picture areas of said surface comprise a layer of photoconductive material.

4. An electrical switching arrangement according to claim 1 wherein the elemental picture areas of said surface comprise a layer of luminescent material.

5. A first electrical switching arrangement according to claim 1, wherein said elemental picture areas of said surface comprise a layer of photoconductive material, and including a second switching arrangement, also according to claim 1, wherein the elemental picture areas comprise a layer of luminescent material and further including a third circuit means for operationally connecting together said first circuit means of said first switching arrangement and said first circuit means of said second switching arrangement; and switching means operationally connected to said third circuit means for alternately switching said periodic voltage variations between the second photoconducting resistors of said adjacent switching elements of both said first and second switching arrangements.

6. The device of claim 1 including a second switching arrangement for reproducing said picture areas, wherein the elemental picture areas comprise a layer of luminescent material and switching means to provide said source of voltage from said switching elements adjacent said picture area to said luminescent layer.

References Cited in the file of this patent

UNITED STATES PATENTS

| | | |
|---|---|---|
| 2,732,469 | Palmer | Jan. 24, 1956 |
| 2,789,193 | Anderson | Apr. 16, 1957 |
| 2,858,363 | Kazan | Oct. 28, 1958 |
| 2,944,155 | Mayer | July 5, 1960 |
| 2,947,912 | Hoffman | Aug. 2, 1960 |